US007836493B2

(12) United States Patent
Xia et al.

(10) Patent No.: US 7,836,493 B2
(45) Date of Patent: Nov. 16, 2010

(54) PROXY SERVER SECURITY TOKEN AUTHORIZATION

(75) Inventors: Sharon (Hong) Xia, Bellevue, WA (US); Dan Brombaugh, Seattle, WA (US)

(73) Assignee: Attachmate Corporation, Seattle, WA (US)

( * ) Notice: Subject to any disclaimer, the term of this patent is extended or adjusted under 35 U.S.C. 154(b) by 801 days.

(21) Appl. No.: 10/421,948

(22) Filed: Apr. 24, 2003

(65) Prior Publication Data

US 2005/0005133 A1 Jan. 6, 2005

(51) Int. Cl.
*G06F 7/04* (2006.01)
(52) U.S. Cl. ........................................................ 726/9
(58) Field of Classification Search ................ 713/156, 713/185; 726/9, 10, 12, 19, 20, 14
See application file for complete search history.

(56) References Cited

U.S. PATENT DOCUMENTS

| 5,592,553 | A | | 1/1997 | Guski et al. |
|---|---|---|---|---|
| 5,684,951 | A | | 11/1997 | Goldman et al. |
| 5,689,638 | A | | 11/1997 | Sadovsky |
| 5,706,349 | A | | 1/1998 | Aditham et al. |
| 5,721,781 | A | | 2/1998 | Deo et al. |
| 5,742,756 | A | | 4/1998 | Dillaway et al. |
| 5,805,803 | A | * | 9/1998 | Birrell et al. ................... 726/12 |
| 5,850,451 | A | | 12/1998 | Sudia |
| 5,907,621 | A | | 5/1999 | Bachman et al. |
| 5,951,636 | A | | 9/1999 | Zerber |
| 5,999,711 | A | | 12/1999 | Misra et al. |
| 5,999,766 | A | | 12/1999 | Hisatomi et al. |
| 6,012,066 | A | | 1/2000 | Discount et al. |
| 6,041,357 | A | | 3/2000 | Kunzelman et al. |
| 6,061,741 | A | | 5/2000 | Murphy, Jr. et al. |
| 6,128,738 | A | * | 10/2000 | Doyle et al. ................ 713/185 |
| 6,134,658 | A | | 10/2000 | Multerer et al. |
| 6,161,182 | A | | 12/2000 | Nadooshan |
| 6,189,096 | B1 | * | 2/2001 | Haverty ...................... 713/155 |
| 6,223,287 | B1 | | 4/2001 | Douglas et al. |
| 6,253,248 | B1 | | 6/2001 | Nakai et al. |

(Continued)

OTHER PUBLICATIONS

WRQ Reflection for the Web—Secure access inside and outside the firewall.

(Continued)

*Primary Examiner*—Ellen Tran
(74) *Attorney, Agent, or Firm*—Nixon & Vanderhye PC

(57) ABSTRACT

A management server manufactures a secure, tamper-resistant token for a particular user specifying the permissions and authorizations that user possesses. The token may be in the form of a digitally-signed message specifying, for example, a particular computer and associated port number that the user is permitted to access. The management server delivers the token to the user, preferably over a secure communications session. When challenged, the user presents the secure token to the security proxy server. The security proxy server examines the token to be sure it is authentic and has not be tampered with, and then extracts information contained in the token to determine the user's authorization to access a particular computer, particular port number and/or other resource. The security proxy server then establishes authorized communication with the authorized computing resource based on the information contained in the user's token, and thereafter may act in one embodiment as essentially a passthrough or proxy for permitting the user to access and communicate with the resource.

14 Claims, 4 Drawing Sheets

U.S. PATENT DOCUMENTS

| | | | |
|---|---|---|---|
| 6,279,030 | B1 | 8/2001 | Britton et al. |
| 6,324,683 | B1 | 11/2001 | Fuh et al. |
| 6,327,662 | B1 | 12/2001 | Araujo |
| 6,377,691 | B1 | 4/2002 | Swift et al. |
| 6,446,206 | B1 | 9/2002 | Feldbaum |
| 6,510,464 | B1* | 1/2003 | Grantges et al. ............ 709/225 |
| 6,996,841 | B2* | 2/2006 | Kadyk et al. .................. 726/12 |
| 7,137,006 | B1* | 11/2006 | Grandcolas et al. ......... 713/180 |
| 7,139,917 | B2 | 11/2006 | Jablon |
| 2002/0031230 | A1* | 3/2002 | Sweet et al. ................ 380/278 |
| 2002/0157019 | A1 | 10/2002 | Kadyk et al. |
| 2003/0028495 | A1 | 2/2003 | Pallante |
| 2003/0036999 | A1 | 2/2003 | Mirlas et al. |
| 2003/0196087 | A1* | 10/2003 | Stringer et al. .............. 713/171 |
| 2004/0128502 | A1 | 7/2004 | Royer |
| 2004/0128546 | A1* | 7/2004 | Blakley et al. .............. 713/201 |
| 2004/0162786 | A1* | 8/2004 | Cross et al. ................... 705/59 |

OTHER PUBLICATIONS

Dierks & Allen Standards Track Jan. 1999 The TLS Protocol Version 1.0 pp. 1-80.

Connected: An Internet Encyclopedia 14.34 Proxy Authorization http://www.freesoft.org/CIE/RFC/2068/195.htm.

Bertold Kolics, MTA-SzTAKI Bertold. Kolica@swztaki.hu Proxy Authentication with Squid.

Fielding et al, Standards Track, Network Working Group Hypertext Transfer Protocol—HTTP/1.1 J, Jun. 1999 pp. 1-176.

Warsaw barry@wooz.org [Zzope3-checkins]CVS: Zope3/lib/pthon/Zope/Security, Dec. 2002.

Thompson et al Proceedings of the $8^{th}$ USENIX Security Symposium Aug. 1999 Certificate-Based Access Control for Widely Distributed Resources.

Gilmore et al AT&T Labs, Research pp. 1-12 Secure Remote Access to an Internal Web Server.

Jacobs Mitre Corp. USCINCPAC/J6 An Authorization Framework for Web-based Applications djacobs@mitre.org.

User Authentication and Authorization in a Networked Library pp. 3-10.

Rozmanov NTLM Authorization Proxy Server Nov. 2001.

Web proxy Server Information Page, pp. 1-12.

Understanding Cisco CNS Access Registrar HLR Proxy Server pp. 1-19, Oct. 2002.

Configuring the Cisco SIP Proxy Server pp. 1-37, Jan. 2003.

WRQ Reflection, Security Solutions.

Kohl, J., "RFC 1510—The Kerberos Network Authentication Service (V5)," 85 pages (Sep. 1993).

Microsoft TechNet, Article 313407, "How to: Create Automatic Certificate Requests with Group Policy in Windows," 2 pages (2003).

Gilmore et al., "Secure Remote Access to an Internal Web Server," AT&T: 1999. http://www.isoc.org/isoc/conferences/ndss/99/proceedings/papers/gilmore.pdf (1999).

Office Action issued in commonly assigned copending U.S. Appl. No. 10/875,606 (Apr. 26, 2010).

* cited by examiner

PROXY SERVER SECURITY TOKEN AUTHORIZATION

FIELD

Exemplary embodiments herein generally relate to secure computing, and more particularly to authorization and permissions. Still more particularly, exemplary embodiments relate to authorizing users to access a remote computer using a secure proxy server that challenges the users to present secure authorization tokens issued e.g. by a management server.

BACKGROUND AND SUMMARY

As we rely more and more on computers and computer networks, computing security becomes increasingly more important. We read in the newspaper about cyber criminals breaking into computers and computer networks and stealing critical information such as credit card and bank account information. We are always on the lookout for computer viruses that may attack and destroy information on our computers. Imagine the harm that could result if confidential computerized medical or personnel records are broken into and distributed over the Internet.

Much has been done to solve these problems. For example, tools have been developed that allow computers to communicate securely. In the context of the World Wide Web, a security protocol known as Secure Sockets Layer (SSL) provides both privacy (e.g., secrecy) and authentication (e.g., confidence that a computer's and/or user's asserted identity is true). The SSL technology has been built into most Internet browsers and web servers, and so has become widely available to protect electronic commerce and other sensitive communications.

The SSL protocol works by encrypting data passing between computers through use of encryption keys and associated encryption techniques. The SSL technology also provides secure authentication over a series of successive data exchanges. This authentication for example prevents an attacker from injecting his or her own computing device between already-communicating computers to intercept sensitive information and/or insert inauthentic information (e.g., substituting the attacker's own shipping address for that of a legitimate user) into the data stream being exchanged. See also a related Transport Layer Security (TLS) protocol that has become an Internet standard (RFC 2246).

FIG. 1 shows an example use of such security protocols. In the illustrative example shown, a user operating an input-output device 50 wants to communicate with computer 52. The user's device 50 (which may be a so-called "client") has the SSL/TLS functionality in this example. The conventional computer 52 may or may not have this SSL/TLS functionality but it is nevertheless desired to provide secure communications between the user device and the computer. While it would be possible to modify the computer 52 to provide SSL/TLS capabilities, this may not always be practical or cost-effective.

An alternative approach shown in exemplary illustrative FIG. 1 is to introduce a security proxy server 54 between the user device 50 and the computer 52. Security proxy server 54 has the requisite SSL/TLS capabilities to communicate securely with the user device 50, and otherwise acts as a passthrough for the data content traveling between computer 52 and the user computer 50. In a particular example shown, the user device 50 and the security proxy server 54 establish a secure data communications session using the SSL/TLS, SSH or any other desired secure protocol. In this particular example, a negotiation process 56 is performed between the user computer 50 and the security proxy server 54. This negotiation process 56 results in negotiating a secure session including session encryption keys for use during the data exchange to follow.

Based upon the security parameters set up through the negotiation phase 56, the user computer 50 and security proxy server 54 establish a secure "tunnel" 58 over the network. This secure tunnel—which is in this example constructed using cryptography—provides a private, authenticable secure link for carrying the data between user device 50 and security proxy server 54. This secure tunnel 58 can be supported by an insecure network such as the Internet and yet still provide both privacy and authentication for communications between user device 50 and server 54.

To communicate with computer 52, user device 50 sends information through the secure tunnel 58 to the security proxy server 54. The security proxy server 54 extracts the received information and passes it along to computer 52 over a further communications link 60 (which in this case may be unencrypted and rely on physical security such as controlled access to a physical facility as well as a secure firewall). When computer 52 wants to send a message to the user device 50, it communicates the message to the security proxy server 54 over link 60. The security proxy server 54 in turn communicates the message via secure tunnel 58 to user device 50. While end-to-end security is not provided in this particular example, the arrangement shown is adequate and very useful for many situations where it is desirable to use a computing device 52 behind a firewall (which may be part of proxy server 54's functionality) that does not have SSL/TLS protocol capabilities.

These known security techniques and protocols have been widely successful and are very useful for allowing secure communications to proceed over an essentially insecure network such as the Internet. However, security problems remain requiring additional solutions.

One area that the Secure Sockets Layer and Transport Security Layer protocols do not directly address relates to certain authorization issues. User or computer authorization generally relates to granting or withholding privileges or permissions to access particular computers or computing functions. For example, in connection with an enterprise such as a company or any other organization large or small, there may be some confidential computerized information and/or functions that are restricted for access by only certain users or classes of users. For example, some enterprises have especially confidential data stored on a special server that only certain users are allowed to log into. In other contexts, access to certain software functionality may be limited to only certain authorized users. Even within a particular software application, it is commonplace for some functionality to be restricted to only certain classes of users (e.g., all can view data but only certain users can change the data).

Referring to the FIG. 1 example, it is not readily apparent how flexible secure authorization can be provided. Computer 52 typically thinks it is communicating with security proxy server 54—which in a sense acts as a secure "stand-in" for user device 50. Many different user devices 50 may share the same security proxy server 54. While the arrangement shown in FIG. 1 can certainly accommodate ordinary user name/password based computer 52 authorization functionality, it would be desirable to permit additional, more secure and flexible authorization management.

Preferred exemplary illustrative non-limiting embodiments solve these and other problems by introducing new authorization functionality within the security proxy server. Such authorization functionality may use tokens supplied to user devices by other trusted computers or agents such as a management server for example—these tokens specifying to the security proxy server which permissions and authorizations are being granted to particular users.

In one example non-limiting illustrative arrangement, a management server manufactures a secure, tamper-resistant token for a particular user specifying the permissions and authorizations that user possesses. The token may be in the form of a digitally-signed message specifying, for example, a particular computer and associated port number that the user is permitted to access. The management server delivers the token to the user, preferably over a secure communications session. When challenged, the user then presents the secure token to the security proxy server. The security proxy server examines the token to be sure it is authentic and has not been tampered with, and then extracts information contained in the token to determine the user's authorization to access a particular computer, particular port number and/or other resource. The security proxy server then establishes authorized communication with the authorized computing resource based on the information contained in the user's token, and thereafter may act in one embodiment as essentially a passthrough or proxy for permitting the user to access and communicate with the resource.

Non-limiting exemplary advantages and additional features of exemplary embodiments include:
 The arrangement proves that the user is authorized by the management server or other trusted entity to access a computing resource indicated in the authorization token.
 The arrangement hides the resource information. An attacker could learn how to access the security proxy server but is still not able to obtain the information needed to access the ultimate computing resource. The attacker can't reach past the security proxy server without a valid authorization token.
 The authorization token may contain authorized user information. The security proxy server may log user information in a proxy server log file for monitoring and other purposes.
 An administrator can configure the authorization token to expire after a predetermined time period. Different valid time periods may be used. This prevents the authorization token from being reused by an attacker or by a user who once had but no longer has authorization.
 The session token can be reused within the time period, or the server can invalidate the token after it is used once.

BRIEF DESCRIPTION OF THE DRAWINGS

These and other features and advantages are better and more completely understood by referring to the following detailed description of presently preferred exemplary illustrative non-limiting embodiments in conjunction with the drawings, of which.

DETAILED DESCRIPTION

Figure 2:
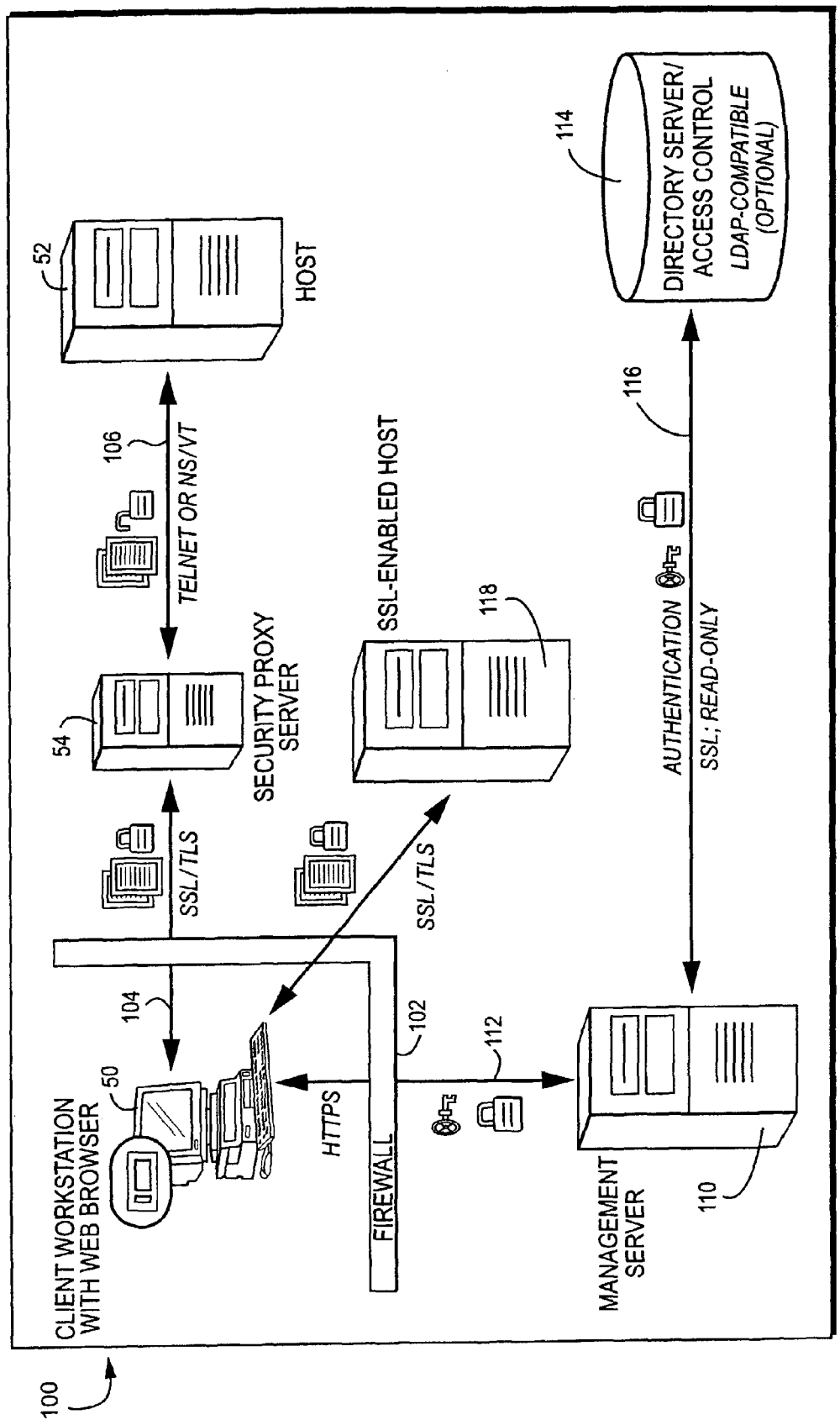
FIG. 2 shows an exemplary illustrative computing network including a management server that mints authorization tokens for examination by the security proxy server.

FIG. 2 shows an example overall non-limiting secure computing arrangement 100. Computing arrangement 100 includes a user or client device 50 that wishes to communicate with a computer 52 or other computing resource. The user device 50 may be any sort of device including a data entry means and a display means. Examples include a personal computer workstation with World Wide Web browser running Microsoft Windows, Macintosh, Linux, Unix or any other suitable operating system, a web-enabled cellular telephone, personal data assistant, entertainment device, or any other networked computing device. Computer 52 may be any computing or networked resource. In one specific non-limiting example, computer 52 comprises a so-called "legacy" host computer such as a mini computer or main frame computer (e.g., an IBM or other main frame, an AS/400 or other midsize computer, a Unix host, an OpenVMS host, Hpe3000, or any other environment).

Figure 1:
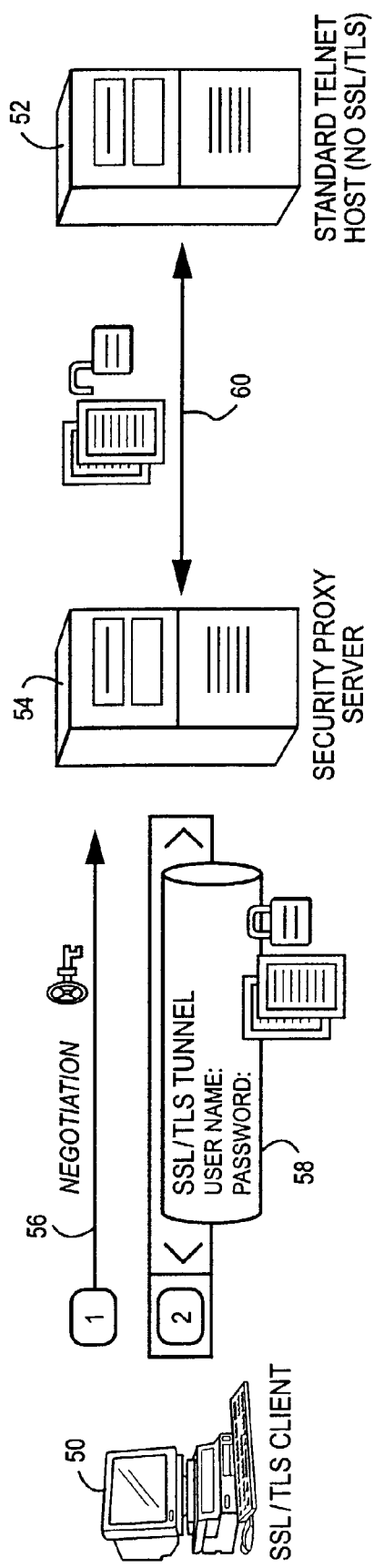
FIG. 1 shows an example communication between a user device and a computer or other resource through a security proxy server.

As discussed in connection with FIG. 1, user device 50 communicates with computer 52 through a security proxy server 54. In the particular example shown, the user device 50 is located outside of a firewall 102, and may be connected to the security proxy server 54 via any convenient networking or other data communications arrangement including for example the Internet, a Virtual Private Network (VPN), a wireless network or connection, a local area or wide area network, or any other desirable data communications link. In the exemplary arrangement shown, a suitable conventional secure protocol is used to provide privacy and authentication for the communications between user device 50 and security proxy server 54 occurring over link 104. In one exemplary arrangement, the SSL/TLS protocol may be used but other embodiments may use additional and/or different security protocol arrangements depending upon a particular need and other circumstances.

In the example shown, the security proxy server 54 communicates within the firewall 102 with computer 52 over an additional data link 106. Data link 106 can but need not be protected (e.g., with encryption) depending upon the particular circumstances (e.g., physical security may be adequate to protect the data being communicated over the link). In the general case, there will be multiple user devices 50 communicating with security proxy server 54 and/or security proxy server 54 may be communicating with many different computers 52 or other computing resources.

System 100 in the exemplary illustrative embodiment also includes a management server 110. Management server 110 in the exemplary non-limiting arrangement shown manages communications between user device 50 and computer 52 by communicating with the user device 50. Management server 110 does this by issuing authorization tokens to user device 50 that can be authenticated by security proxy server 54 and used to guide or control the permissions that the security proxy server grants to the user device. In this particular instance, the user device 50 is not trusted at least because it is outside of firewall 102. In the exemplary embodiment, management server 110 generates authorization tokens which it supplies to the user device 50. Security proxy server 54 will not allow the user device 50 to access computer 52 or other computing resources without an unexpired, appropriate security token.

In the exemplary embodiment, management server 110 supplies such authorization tokens to user device 50 over a link 112 that passes outside of firewall 102. In the example shown, a secure communications protocol (e.g., HTTPS) of conventional nature is used to protect link 112 and to authenticate user device 50 to the management server 110 so the management server can be assured it is not providing the authorization token to an attacker or other unauthorized user. As part of this secure protocol, user device 50 may be required to prove it is authentic (e.g., by providing a password, a certificate, etc.). Management server 110 in this example issues tokens only to authentic users.

Management server 110 also has access to a conventional directory server 114 providing access control and authorization information (e.g., via conventional LDAP or other directory services) to determine which authorizations to grant to particular user devices 50. Management server 110 in this illustrative example communicates with directory server 114 via a secure (e.g., SSL-protected) data link 116 within firewall 102.

As also shown in FIG. 2, the user device 50 may communicate with any number of additional computers 118 some of which may be capable of secure (e.g., SSL/TLS or other) communications. In such case, security proxy server 54 may not need to be placed between user device 50 and computer 118, although additional policy management and other authorization functionality can be provided by the security proxy server 54 even if computer 118 could maintain a secure session with user device 50 without use of the security proxy server.

In one example non-limiting embodiment, management server 110 may comprise a "Reflection for the Web" (RWeb) management server installed on a conventional web server computer. An application server such as Tomcat or Websphere may be used. User device 50 may provide a conventional web browser that supports JAVA or other applet technology—these applets being used to provide host or other emulation functionality in this particular example. The security proxy server 54 is placed, in the exemplary arrangement, in the same sub-net behind the same firewall 102 as computer 52. Data between the security proxy server 54 and computer 52 are not encrypted in this particular example. In this example, only one port needs to be opened on the firewall 102 between the user device 50 and the security proxy server 54 for clients 50 to connect with multiple computing devices 52 from their web browsers. In the illustrative non-limiting example shown, the communications between the user device 50 and the management server 110 is HTTPS, although other secure communications protocols could be used instead. In the illustrative non-limiting example shown, the communication between the user device 50 and the security proxy server 54 is SSL/TLS over TCP/IP although other secure protocols and transport protocols may be used in other applications as desired.

Figure 3:
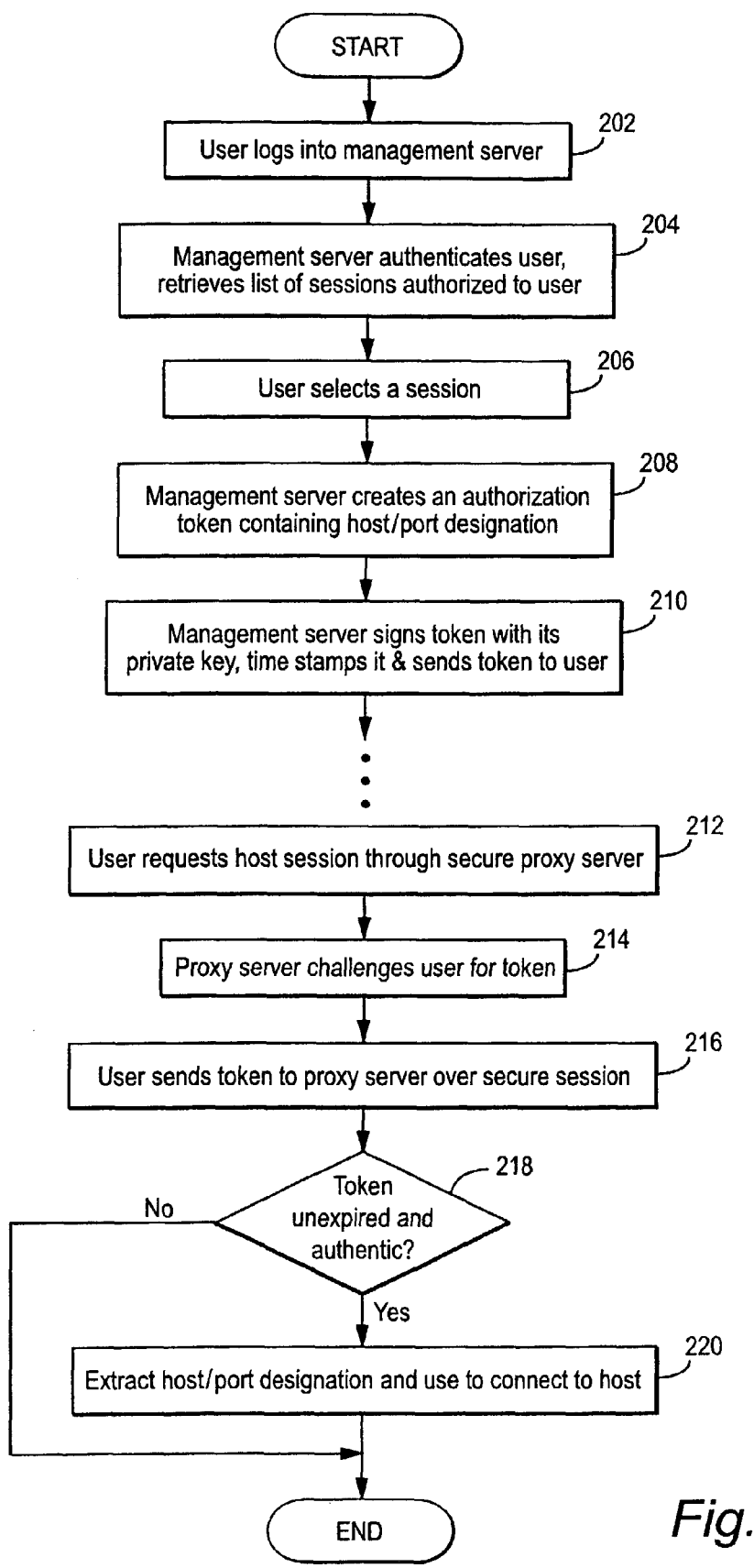
FIG. 3 shows an exemplary non-limiting illustrative process.

FIG. 3 shows an example non-limiting flow chart of illustrative non-limiting steps performed within the FIG. 2 system 100. In the example shown, a user at user device 50 directs his or her web browser to management server 110 in order to log into the management server (FIG. 3, block 202). The management server 110 first authenticates the user (FIG. 3, block 204). Management server 110 may perform this user authentication in a way that depends upon the particular access control model. For example, if the exemplary arrangement uses LDAP, the management server 110 may authenticate the user with an LDAP user name/password. If desired, the user device 50 may present a digital certificate or other credential so management server 110 can be assured that the user device 50 is authenticate.

Once the management server 110 has determined who is operating user device 50 and is satisfied that the user and associated device are authenticate, it may retrieve a list of sessions and authorizations that the user device 50 and/or its associated user is authorized to access (FIG. 3, block 204). In one example embodiment, the management server 110 sends to the user device 50 a list of authorized sessions or other resources. For example, the management server 110 may send a "links list" in HTML or other format listing the sessions or other computing resources that the user is authorized to access. In such a case, the user may select a link from the "links list" for use in a secure session (FIG. 3, block 206).

Figure 4:
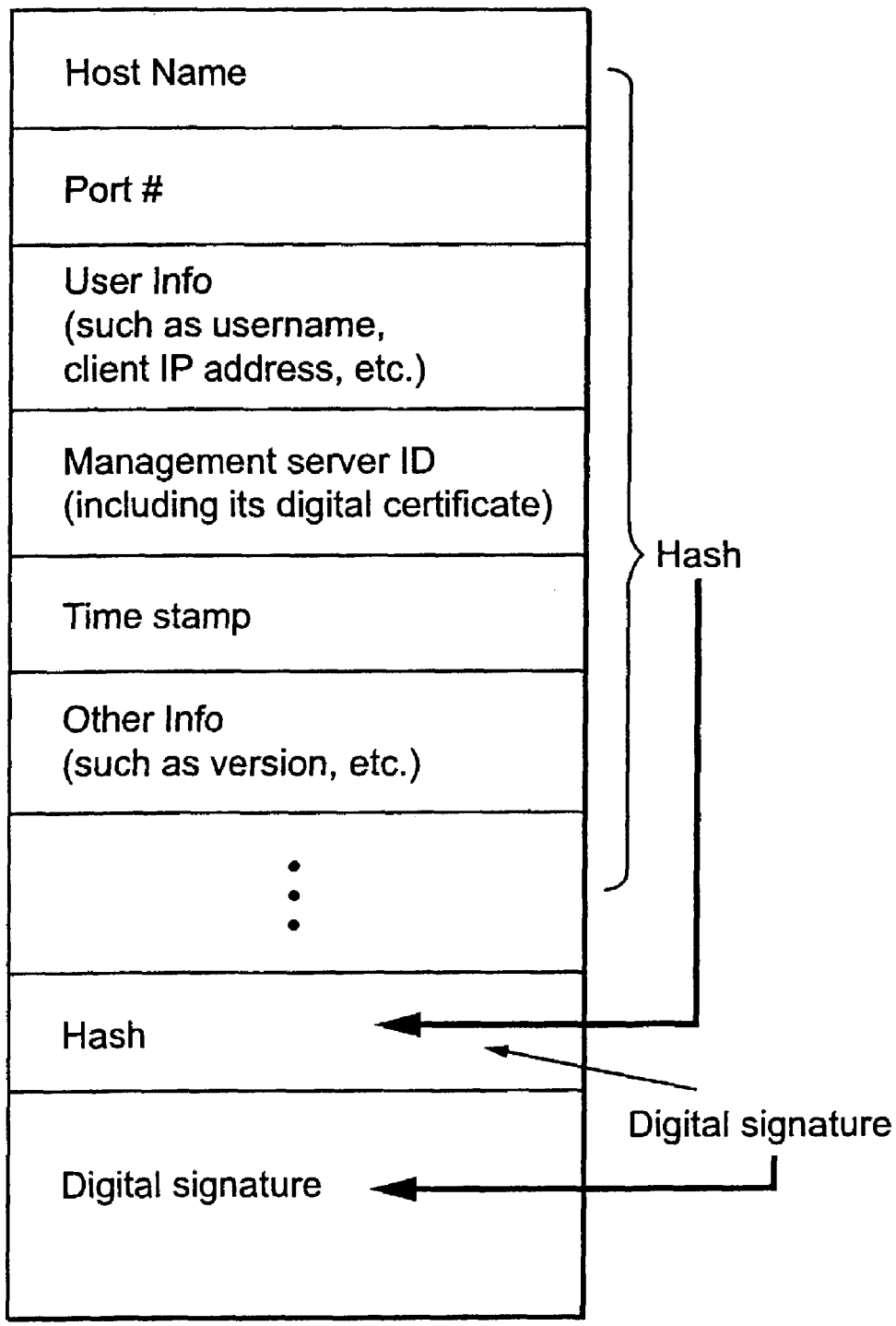
FIG. 4 shows an exemplary illustrative non-limiting authorization token data structure.

In a particular example shown, the management server may respond by sending user device 50 HTML or XML including or referencing a particular page, command, emulator applet or other functionality that user device 50 should begin executing, following or using in order to activate the secure session with proxy server 54. In the example shown, the management server 110 also sends to user device 50 an "authorization token" (FIG. 3, block 208). In this particular non-limiting example, the authorization token (an example of which is shown in more detail in FIG. 4) may contain the authorized computer 52 name and port number as well as other information. In the example shown, the authorization token is preferably digitally signed with the management server 110's private key. The token is preferably also time stamped and/or provided explicitly or implicitly with a particular finite expiration date and time. See FIG. 3, block 210. As shown in FIG. 4, the token's digital signature may include a hash message digest which ensures the data is not tampered with. The hash is digitally signed by the management server using its private key. This digital signature proves the token was issued by the management server.

In the non-limiting example shown, the user device 50 connects to the security proxy server 54 via link 104. For example, the user device 50 and security proxy server 54 may begin a standard SSL/TLS handshake. Both SSL server and client may be authenticated by its peer in the exemplary arrangement to provide additional security above the normal arrangement where client authentication is optional (in this case it is the user device 50 that is not trusted by the security proxy server 54). In the example shown, once the user device 50 has authenticated the security proxy server 54 and the security proxy server 54 has authenticated the user device 50, the security proxy server challenges the user device 50 for the authorization token (FIG. 3, block 214). The user device 50 responds to this challenge by sending the encrypted authorization token to the security proxy server 54 (FIG. 3, block 216). The security proxy server 54 verifies that the authorization token is signed by the management server 110 (e.g., by decrypting the digital signature using the management server's public key), and also verifies that the authorization token has not been tampered with and is not expired. If the security proxy server 54 determines that the authorization token is unexpired and is authenticate ("yes" exit to FIG. 3 decision block 218), the proxy server extracts the computer name and port number from the authorization token and uses this information to connect to the designated computer 52 via the appropriate port (FIG. 3, block 220). If, on the other hand, the security proxy server 54 determines that the token is not authentic and/or has expired ("no" exit to FIG. 3 decision block 218), the security proxy server 54 declines to establish any connection with computer 52.

Once the security proxy server 54 establishes a connection with computer 52, it functions as a conventional proxy server by passing through data communications between the computer 52 and user device 50.

While the standard SSL/TLS (RFC 2246) security protocol generally does not support authorization, the security proxy server 54 in the exemplary non-limiting embodiment adds authorization functionality by verifying, examining and acting in response to an authorization token created by management server 110. Such an authorization token authorizes a user to access a specific system 52 in the exemplary illustrative embodiment. The authorization token contains authorized computer information and user information in the illustrative embodiment. It is digitally signed using the private key of the management server 110 and is time stamped. The authorization token is transferred from management server 110 to user device 50 over secure link 112 and from the user device 50 to the security proxy server 54 over secure link 104. The authorization token proves that the user device 50 and/or the associated user is authorized by the management server 110 to access the computer 52 indicated in the authorization token.

The authorization token and/or the way it is transferred hides the information identifying computer 52 and techniques for accessing it. An attacker outside of firewall 102 may learn the name and port number of the security proxy server 54, but in this particular example it cannot obtain the information needed for accessing computer 52 such as host name and port number. An attacker cannot get through the security proxy server 54 without a valid authorization token. The authorization token also may contain authorized user information used for logging by the security proxy server 54. An administrator can configure the authorization token valid or expiration time period to prevent the authorization token from being reused later—for using the user device 50 to obtain a new authorization token from management server 110.

It is to be understood that the invention is not to be limited to the disclosure, but on the contrary, is intended to cover various modifications and equivalent arrangements included within the scope of the claims.

The invention claimed is:

1. A method of authorizing use of a particular computing resource by a user, comprising:
   (a) a management server issuing, to a user computer, a secure authorization token, said secure authorization token having data including connection permission information that identifies the specific protected computer resource by at least one of name and port number;
   (b) examining, with a proxy server, the secure authorization token for authenticity, and extracting, with said proxy server, said connection permission information contained in the token to determine the user's authorization to access said specific protected computing resource; and
   (c) if the secure authorization token is authentic, said proxy server using said secure authorization token data connection permission information to establish a proxy connection with said specific protected computing resource on behalf of the user and acting as an intermediary to pass information between the user computer and the specific protected computing resource, without said proxy server accessing or communicating with the management server to obtain user authorization information, wherein said management server is separate from said proxy server, said protected computing resource and said user computer.

2. The method of claim 1 wherein said management server comprises a trusted entity different from said proxy server.

3. The method of claim 1 wherein said management server digitally signs said token with a digital signature and said examining includes authenticating said digital signature.

4. The method of claim 1 wherein said management server time-stamps said token.

5. The method of claim 1 further including said proxy server challenging said user for said token and said user responding to said challenge by presenting said token to said proxy server.

6. The method of claim 1 wherein said using step is performed conditionally based at least in part on whether said token is unexpired.

7. The method of claim 1 wherein said using step includes extracting both a computer name and port number from said token and establishing a connection using said computer name and port number.

8. A proxy server comprising:
   means for receiving a secure authorization token from a user device, said secure authorization token having been issued by a management server, said authorization token including connection data comprising computer name and port number
   means for examining said token to determine the authenticity thereof and to extract at least connection data therefrom; and
   means for establishing a proxy server session conditioned on the authenticity of said token, wherein said proxy server acts as an intermediary between said user device and a specific protected computing resource the token specifies and said extracted connection data is used to establish said proxy server session without said proxy server accessing or communicating with said management server to obtain user authorization information.

9. A proxy server comprising:
   a challenge function that challenges a user device to present a secure authorization token issued by a management server;
   a token validator that validates said secure authorization token; and
   a token content extractor that extracts connection information from said validated token including at least one of computer name and port number; and
   a session controller that establishes a proxy connection with a specific protected computing resource based at least in part on the extracted connection information without need for said session controller to directly access or communicate with said management server to obtain user device authorization information, and intermediates a session between said user device and the specific protected computing resource conditioned at least in part on token validation by said token validator, said proxy server using secure authorization token data connection permission information within said secure authorization token to establish a proxy connection with said specific protected computing resource on behalf of the user and acting as an intermediary to pass information between the user computer and the specific protected computing resource.

10. The proxy server of claim 9 wherein said token is digitally signed and said token validator validates said digital signature.

11. The proxy server of claim 9 wherein connection information contained in said token includes at least computer name and port number.

12. The proxy server of claim 9 wherein said token validator determines whether said token has expired and whether said token has been tampered with.

13. The proxy server of claim 9 wherein said management server comprises a trusted entity different from said proxy server.

14. The proxy server of claim 9 wherein said proxy server establishes a first connection behind a firewall with a legacy host computer not equipped with SSL/TLS and establishes a second connection with said user device through said firewall, said proxy server proxying, in said first connection, on behalf of the user device connection.

* * * * *